(12) United States Patent
Whyte et al.

(10) Patent No.: US 8,657,716 B1
(45) Date of Patent: Feb. 25, 2014

(54) DRIVE TRAIN COMPONENT WITH STRUCTURAL COVER

(75) Inventors: Neil John Whyte, Swidnica (PL); Paul Noble, Swidnica (PL); Tony Pistagnesi, Hessen (DE); Michal Drwiega, Swidnica (PL)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 13/613,435

(22) Filed: Sep. 13, 2012

(51) Int. Cl.
*F16H 48/06* (2006.01)

(52) U.S. Cl.
USPC .......................................................... 475/220

(58) Field of Classification Search
USPC ........ 475/230, 243, 245, 246, 247; 74/606 R, 74/607
See application file for complete search history.

(56) References Cited

U.S. PATENT DOCUMENTS

| | | | |
|---|---|---|---|
| 1,211,673 A * | 1/1917 | Calkins | 475/229 |
| 1,944,612 A * | 1/1934 | Repeck | 475/246 |
| 2,015,969 A | 10/1935 | Schildknecht | |
| 4,234,120 A | 11/1980 | Pringle | |
| 4,492,189 A | 1/1985 | Ogawa et al. | |
| 5,156,576 A | 10/1992 | Johnson | |
| 5,271,294 A | 12/1993 | Osenbaugh | |
| 5,279,186 A | 1/1994 | Martin et al. | |
| 5,476,582 A | 12/1995 | Camping | |
| 5,839,327 A | 11/1998 | Gage | |
| 6,105,463 A | 8/2000 | Sporrer | |
| 6,189,413 B1 | 2/2001 | Morse et al. | |
| 6,553,865 B1 | 4/2003 | Endreszl | |
| 6,623,867 B2 | 9/2003 | Crocco et al. | |
| 6,675,676 B2 | 1/2004 | Beutler | |
| 6,729,207 B2 | 5/2004 | Allmandinger et al. | |
| 6,796,404 B1 | 9/2004 | Dick, Jr. et al. | |
| 6,813,972 B2 * | 11/2004 | Guo | 74/606 R |
| 7,004,879 B2 | 2/2006 | Beutler | |
| 7,077,778 B1 * | 7/2006 | Irikura | 475/230 |
| 7,121,972 B2 | 10/2006 | Allmandinger et al. | |
| 7,155,827 B2 * | 1/2007 | Stuart et al. | 29/898.09 |
| 7,231,847 B2 | 6/2007 | Hibbler et al. | |
| 7,241,246 B2 | 7/2007 | Beutler | |
| 7,611,435 B2 | 11/2009 | Beutler | |
| 7,669,330 B1 | 3/2010 | McGean | |
| 7,819,769 B2 | 10/2010 | Beutler et al. | |
| 8,109,000 B2 * | 2/2012 | Zalanca et al. | 29/897.2 |
| 2001/0024989 A1 * | 9/2001 | Morse et al. | 475/230 |
| 2002/0134194 A1 | 9/2002 | Milio | |
| 2004/0060384 A1 | 4/2004 | Guo | |

(Continued)

FOREIGN PATENT DOCUMENTS

EP      2078632 A2      7/2009

*Primary Examiner* — David D Le
*Assistant Examiner* — David J Hlavka
(74) *Attorney, Agent, or Firm* — Harness, Dickey & Pierce, P.L.C.

(57) ABSTRACT

A drivetrain component is provided that may include a housing, a component, a cover and a pair of bearings. The housing may define an internal cavity and a pair of bearing bulkheads. The component may be received in the internal cavity. The cover may be coupled to the housing and may close a side of the internal cavity. The cover may include a pair of bearing caps. Each of the bearing caps may be mounted to a corresponding one of the bearing bulkheads. The pair of bearings may be received on the component. Each bearing may be engaged to an associated one of the bearing bulkheads and an associated one of the bearing caps.

20 Claims, 4 Drawing Sheets

(56) References Cited

U.S. PATENT DOCUMENTS

| | | | |
|---|---|---|---|
| 2004/0216556 A1* | 11/2004 | Smith et al. | 74/607 |
| 2005/0043103 A1 | 2/2005 | Prucher | |
| 2006/0054411 A1 | 3/2006 | Fett et al. | |
| 2008/0312023 A1* | 12/2008 | Beutler et al. | 475/161 |
| 2009/0071287 A1 | 3/2009 | Paskowitz | |
| 2010/0043594 A1 | 2/2010 | Hilker et al. | |
| 2010/0071654 A1 | 3/2010 | Waters et al. | |
| 2010/0189389 A1 | 7/2010 | Fiordalis | |
| 2010/0326236 A1* | 12/2010 | Aisenbrey | 74/607 |
| 2011/0075960 A1 | 3/2011 | White et al. | |

* cited by examiner

DRIVE TRAIN COMPONENT WITH STRUCTURAL COVER

FIELD

The present disclosure relates to a drivetrain component having a structural cover.

BACKGROUND

This section provides background information related to the present disclosure and is not necessarily prior art.

An axle assembly for a vehicle may include a housing having a cover. A differential may be disposed within the housing for rotation relative thereto. Design criteria for axle housings and covers may include considerations for strength, weight and seal integrity. This may be particularly true for housings and covers designed for use in cars, trucks, vans, sport-utility vehicles and/or other consumer and commercial vehicles, as owners and operators of these vehicles are increasingly demanding improved fuel economy without sacrificing performance and durability. Conventional housing covers are typically formed entirely from a metallic material to provide strength and durability.

SUMMARY

This section provides a general summary of the disclosure, and is not a comprehensive disclosure of its full scope or all of its features.

In one form, the present disclosure provides a drivetrain component that may include a housing, a component, a cover and a pair of bearings. The housing may define an internal cavity and a pair of bearing bulkheads. The component may be received in the internal cavity. The cover may be coupled to the housing and may close a side of the internal cavity. The cover may include a pair of bearing caps. Each of the bearing caps may be mounted to a corresponding one of the bearing bulkheads. The pair of bearings may be received on the component. Each bearing may be engaged to an associated one of the bearing bulkheads and an associated one of the bearing caps.

In another form, the present disclosure provides a drivetrain component that may include a carrier housing, a differential assembly and a cover. The carrier housing may include a pair of bearing bulkheads and a pair of mounting flanges. The bearing bulkheads may define a rotational axis. The mounting flanges may be disposed on opposite sides of the rotational axis such that a first one of the mounting flanges spans the bearing bulkheads on a first side of the rotational axis and a second one of the mounting flanges spans the bearing bulkheads on a second side of the rotational axis. The differential assembly may be mounted to the bearing bulkheads and may include a differential case and a pair of differential bearings mounted to the differential case. The differential bearings may be received on the bearing bulkheads. The cover may include a shell portion and a bridge portion. The shell portion may be mounted to the mounting flanges. The bridge portion may be coupled to the bearing bulkheads and may secure the differential bearings to the carrier housing.

In yet another form, the present disclosure provides a drivetrain component that may include a carrier housing, a differential assembly and a cover. The carrier housing may include a pair of bearing bulkheads and a pair of mounting flanges. The bearing bulkheads may define a rotational axis. The mounting flanges may be disposed on opposite sides of the rotational axis such that a first one of the mounting flanges spans the bearing bulkheads on a first side of the rotational axis and a second one of the mounting flanges spans the bearing bulkheads on a second side of the rotational axis. The differential assembly may be mounted to the bearing bulkheads and may include a differential case and a pair of differential bearings mounted to the differential case. The differential bearings may be received on the bearing bulkheads. The cover may include a shell portion and a bridge portion. The shell portion may be formed of a first material including plastic that is over-molded onto the bridge portion such that at least a portion of the bridge portion is encased in and cohesively bonded to the shell portion. The shell portion may be mounted to the mounting flanges. The bridge portion may be formed of a second material including metal. The bridge portion may be coupled to the bearing bulkheads and may secure the differential bearings to the carrier housing. The bridge portion may have a mount that includes a pair of bosses. Each of the bosses may be adapted to receive a fastener therein to mount the cover to a vehicle sub-frame.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, and/or components, but do not preclude the presence or addition of one or more other features, elements, components, and/or groups thereof. When an element or layer is referred to as being "on," "engaged to," "connected to," or "coupled to" another element or layer, it may be directly on, engaged, connected or coupled to the other element or layer, or intervening elements or layers may be present.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
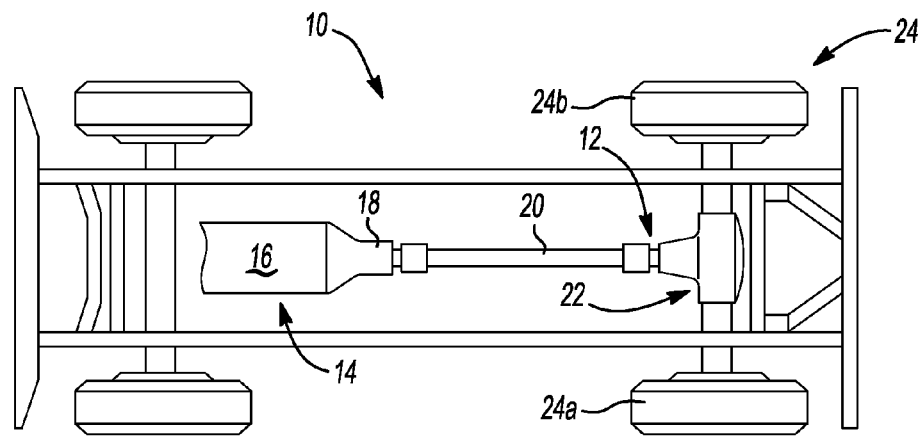
FIG. 1 is a schematic illustration of a vehicle having a rear axle assembly constructed in accordance with the teachings of the present disclosure.

With reference to FIG. 1 of the drawings, a vehicle 10 is illustrated as having a drivetrain component that is constructed in accordance with the teachings of the present disclosure. In the particular example provided, the drivetrain component is a rear axle assembly 22, but those skilled in the art will recognize from this disclosure that the teachings of the present disclosure have application to other types of axle assemblies (e.g., front axle assemblies), as well as to other driveline components. The vehicle 10 can include a driveline 12 that is drivable via a connection to a power train 14. The power train 14 can include an engine 16 and a transmission 18. The driveline 12 can include a propshaft 20, the rear axle assembly 22 and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The propshaft 20 can be coupled for rotation with the output of the transmission 18. Drive torque can be transmitted through the propshaft 20 to the rear axle assembly 22 where it can be selectively apportioned in a predetermined manner to the left and right rear wheels 24a and 24b, respectively.

Figure 2:
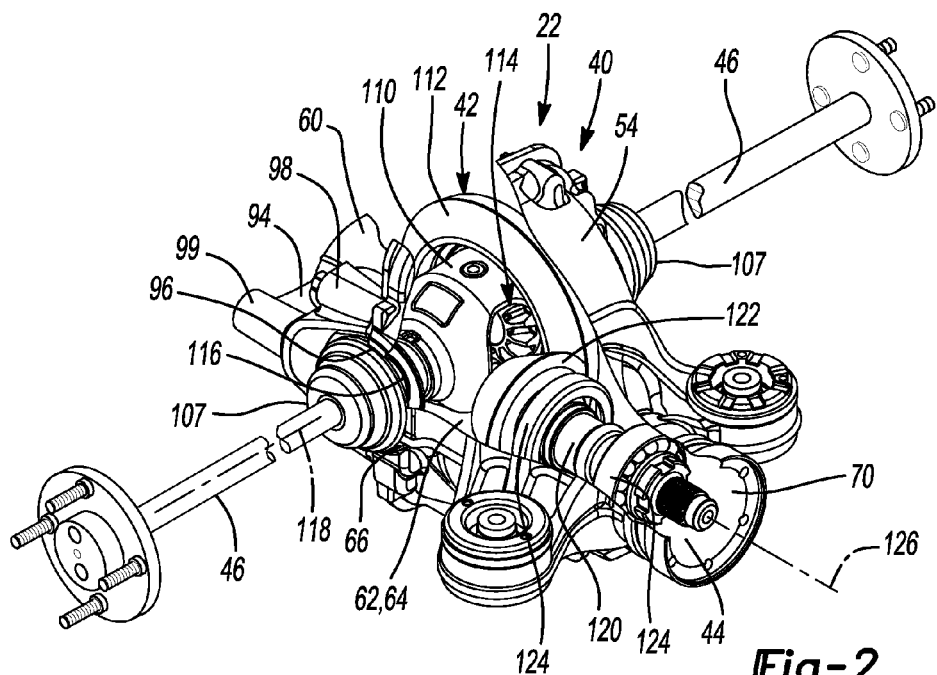
FIG. 2 is a partially broken-away perspective view of a portion of the vehicle of FIG. 1 illustrating the rear axle assembly in more detail.

With reference to FIG. 2, the rear axle assembly 22 can include an axle housing assembly 40, a differential assembly 42, an input pinion assembly 44, and a pair of axle shafts 46. Except as described in detail herein, the differential assembly 42, the input pinion 44 and the axle shafts 46 can be generally conventional in their construction and operation, and as such, these components need not be discussed in significant detail herein. Briefly, the input pinion 44 can be housed in the axle housing assembly 40 and can include an input shaft 120 and an input pinion 122 that can be coupled to the input shaft 120 for rotation therewith about a first axis. An end of the input shaft 120 opposite the input pinion 122 can be adapted to be coupled to a driveline component, such as the propshaft 20 (FIG. 1), to receive rotary power therefrom.

The differential assembly 42 can be any type of differential assembly, such as an open differential assembly, a limited slip differential assembly and/or a locking differential assembly, for example. The differential assembly 42 can include a differential case 110, a ring gear 112, a differential gearset 114, and a pair of differential bearings 116. The ring gear 112 can be fixedly coupled to the differential case 110 and can be meshingly engaged with the input pinion 122 to receive rotary power therefrom. The differential gearset 114 can be housed in the differential case 110 and can be configured to transmit rotary power received by the differential case 110 from the ring gear 112 to the axle shafts 46. The differential bearings 116 can be mounted to the differential case 110 and can be configured to support the differential case 110 relative to the axle housing assembly 40 for rotation about a second axis 118 that can be perpendicular to the first axis. The axle shafts 46 can be employed to transmit rotary power from the outputs (e.g., side gears) of the differential gearset 114 to associated ones of the rear wheels 24a and 24b. As will be appreciated, the axle shafts 46 may include one or more universal joints (e.g., Cardan joints, constant velocity joints).

The axle housing assembly 40 can include a carrier housing 54, a cover 60 and a pair of annular gaskets 115. In the particular example provided, the rear axle assembly 22 is configured for a rear independent suspension and as such, the axle housing assembly 40 is configured to be fixedly coupled to a vehicle chassis or sub-frame. It will be appreciated, however, that the teachings of the present disclosure have application to other types of axle assemblies, including Salisbury axle assemblies.

Figure 3:
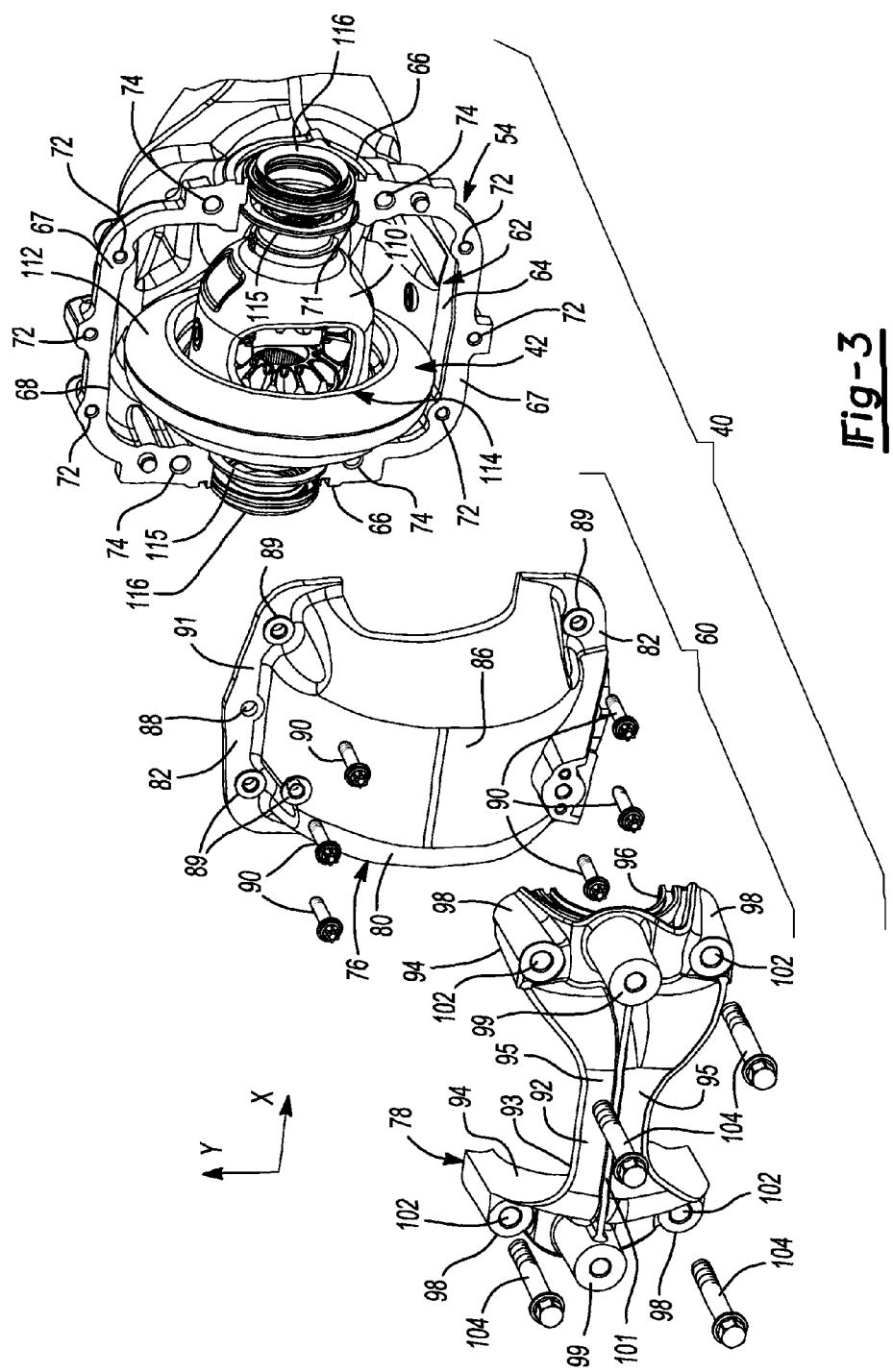
FIG. 3 is a partially exploded perspective view of a portion of the rear axle assembly of FIG. 2 illustrating an axle housing assembly of the rear axle assembly.

With reference to FIGS. 2 and 3, the carrier housing 54 can define an internal cavity 62 that forms a fluid sump 64 in which a liquid lubricant (for lubricating the differential assembly 42 and input pinion assembly 44) is located. The carrier housing 54 can include a pair of bearing bulkheads 66, a pair of mounting surfaces 67, a differential aperture 68, which can be disposed on a first side of the carrier housing 54 (FIG. 3), and a pinion aperture 70, which can be disposed on a second side of the carrier housing 54 (FIG. 2) opposite the differential aperture 68. Each of the bearing bulkheads 66 may include an annular shoulder 71 (FIG. 3) and can be configured to partly receive the differential bearings 116. The mounting surfaces 67 can include a plurality of first apertures 72 and a plurality of second apertures 74. The second apertures 74 can be located on the bearing bulkheads 66. The differential aperture 68 can be configured to permit the differential assembly 42 to be received into the internal cavity 62. The pinion aperture 70 can be sized to receive the input shaft 120.

Referring now to FIGS. 3-6, the cover 60 can include a shell portion 76 and a bridge portion 78. The shell portion 76 can be molded or otherwise formed from one or more suitable materials, such as a polymer, a reinforced polymeric material, a metal, a ceramic and/or a composite material. In the particular example provided, the shell portion 76 is over-molded onto the bridge portion 78 such that the bridge portion 78 is cohesively bonded to and partly encased in the shell portion 76. It will be appreciated, however, that the shell portion 76 could be formed as one or more discrete components that are subsequently assembled to the bridge portion 78.

Figures 4, 5:
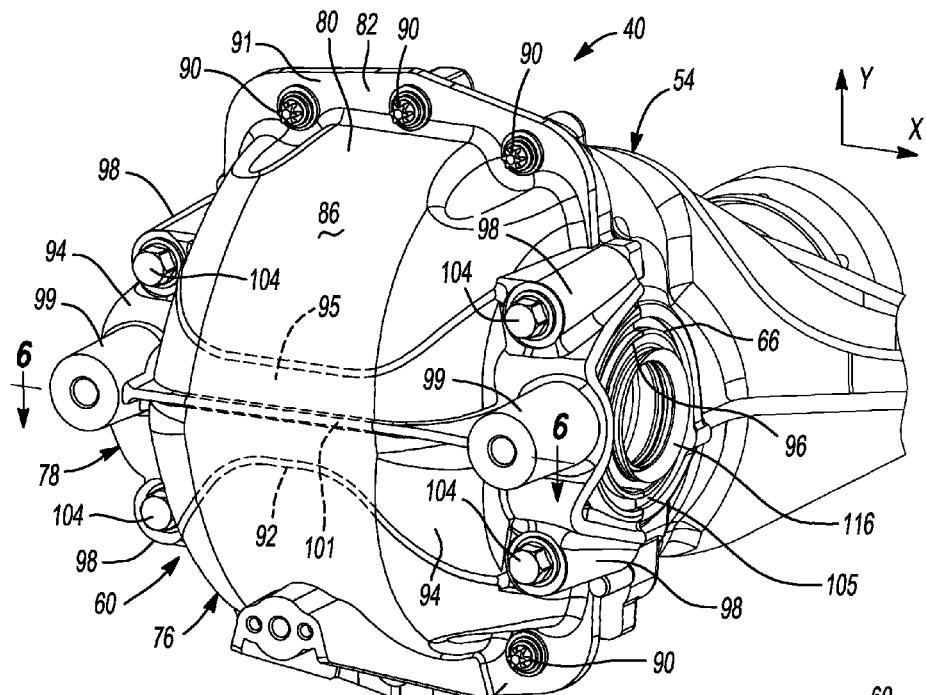
FIG. 4 is a perspective view of a portion of the axle housing assembly.
FIG. 5 is a perspective view of a portion of the rear axle assembly of FIG. 2 illustrating a cover of the axle housing assembly.

The shell portion 76 may include a body 80 and a pair of flanges 82 that extend outward from opposite ends of the body 80. The body 80 may include a concave internal surface 84 (FIGS. 5 and 6), which can face the internal cavity 62 of the carrier housing 54, and a convex external surface 86 (FIGS. 4 and 6), which can face generally away from the carrier housing 54. The body 80 may span the differential aperture 68 in a first direction, such as laterally (i.e., in a direction Y as shown in FIGS. 3 and 4) such that the flanges 82 sealingly engage the mounting surfaces 67. Apertures 88 (FIGS. 3 and 5) in the flanges 82 may be aligned with corresponding ones of the first apertures 72 in the mounting surfaces 67 such that fasteners 90 may be received through apertures 88 and threadably engage the first apertures 72 to secure the shell portion 76 to the carrier housing 54. In some embodiments, metallic bushings 89 (FIG. 3) may be received in the apertures 88 and abut heads of the fasteners 90 and outward facing surfaces 91 of the flanges 82 to spread the clamp-load produced by the fasteners 90 and/or limit the clamp-load exerted by the fasteners 90 onto the flanges 82. The fasteners 90 may be tightened against the bushings 89 and/or flanges 82 to exert a clamping force that urges the flanges 82 into sealed engagement with the mounting surfaces 67. In some embodiments, a gasket or other sealing member (neither shown) may be disposed between the flanges 82 and the mounting surfaces 67 to facilitate sealing between the flanges 82 and the mounting surfaces 67. In other embodiments, the flanges 82 may directly sealingly engage the mounting surfaces 67 without a gasket or other sealing member therebetween.

With reference to FIGS. 3-5, the bridge portion 78 may include a body 92 connecting a pair of bearing caps 94 that are integrally formed with the body 92. The bridge portion 78 may be a relatively rigid body formed from a suitable structural material, such as a reinforced plastic material, a metallic material, or a composite, for example. In the particular example provided, the bridge portion 78 is unitarily formed of aluminum by die casting, but those of ordinary skill in the art will appreciate from this disclosure that other metals, such as steel, iron and/or magnesium, and/or that the bridge portion 78 could be formed of several components that are fastened, welded or otherwise fixedly coupled together.

Figure 6:
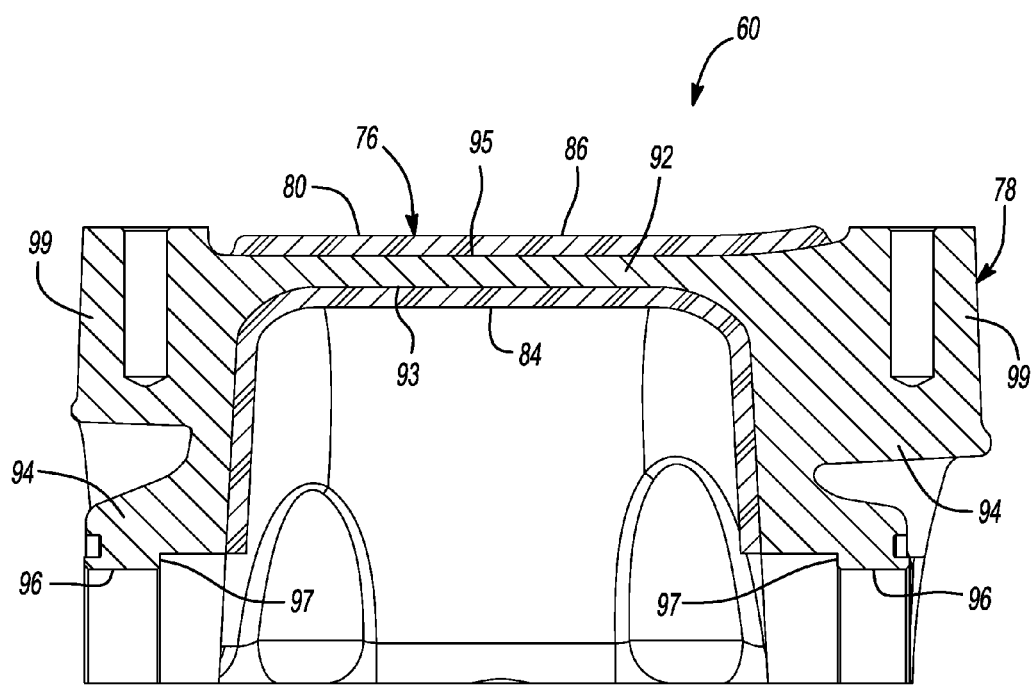
FIG. 6 is a cross-sectional view of the cover taken along line 6-6 of FIG. 4.

As shown in the FIGS. 4-6, the body 92 may be at least partially embedded in the shell portion 76, and the bearing caps 94 may extend laterally outward from the body 92 in opposite directions. The body 92 may be configured to maintain the bearing caps 94 in a predetermined position relative to one another and can be contoured in any manner desired. In the particular example provided, the body 92 is contoured to fit about the ring gear 112, and as such, includes a concave surface 93 (FIG. 6) that faces the internal cavity 62, and a convex surface 95 (FIGS. 3 and 6) that faces away from the carrier housing 54. Reinforcing features, such as a rib 101 that extends laterally between the bearing caps 94, can be integrated into the body 92 as desired.

As shown in FIGS. 3-5, each of the bearing caps 94 may include a cap portion 96, a pair of mounting bosses 98, and a sub-frame boss 99 that can engage a vehicle sub-frame (not shown). The cap portions 96, mounting bosses 98 and sub-frame bosses 99 may be integrally formed on the bearing caps 94. The cap portions 96 may include annular shoulders 97 (FIGS. 5 and 6) facing inward toward each other. Mounting surfaces 100 (FIG. 5) may define ends of the cap portions 96 and ends of the mounting bosses 98. Apertures 102 may extend through the mounting bosses 98 and the mounting surfaces 100. The mounting bosses 98 are configured to receive fasteners 104 that are threaded into the second apertures 74 in the bearing bulkheads 66 to thereby fixedly couple the bearing caps 94 to the carrier housing 54. The fasteners 104 can be tightened to produce a clamp-load that is exerted onto the differential bearings 116 to secure the differential bearings 116 between the bearing bulkheads 66 and the cap portions 96. The clamp-load exerted by the fasteners 104 may also help to facilitate sealing between the mating mounting surfaces 67, 100. A gasket or other sealing member (neither shown) may be disposed between the mating mounting surfaces 67, 100 to help facilitate sealing therebetween.

In some embodiments, the bridge portion 78 and/or the shell portion 76 can include one or more locating features (not shown) configured to cooperate with mating locating features (not shown) of the carrier housing 54 to control alignment of the bearing caps 94 relative to the bearing bulkheads 66. For example, the locating features of the bridge portion 78 and/or the shell portion 76 can include one or more dowel holes and the mating locating features of the carrier housing 54 can include one or more corresponding dowels. The dowel holes may be configured to receive the dowels to thereby align the bearing caps 94 to the bearing bulkheads 66.

The annular shoulders 71, 97 of the bearing bulkheads 66 and cap portions 96, respectively, can cooperate to form counterbores. The annular gaskets 115 can be received into the counterbores and may abut against the annular shoulders 71, 97. Each set of bearing bulkheads 66 and bearing caps 94 can cooperate to define a seal mount 105 that is configured to receive a boot seal 107 (FIG. 2) that can create a seal between the carrier housing 54, the bearing cap 94 and an associated one of the axle shafts 46.

When the cover 60 is installed onto the carrier housing 54, the cap portions 96 of the bridge portion 78 are aligned with the bearing bulkheads 66 of the carrier housing 54. In this manner, the bridge portion 78 may span the differential aperture 68 (FIG. 3) in a direction X (FIGS. 3 and 4) that is perpendicular to the direction Y.

Because the body 92 of the bridge portion 78 extends between the mounting bosses 98, loads on the mounting bosses 98 due to the clamping force of the fasteners 104 and rotation of the differential assembly 42 may be transferred across the cover 60 through the body 92. This may substantially isolate the shell portion 76 from these loads, which may permit the shell portion 76 to be formed from a lighter, less rigid material that may reduce the overall weight of the cover 60 and be more conducive to forming a seal with the mounting surfaces 67 of the carrier housing 54.

While the cover 60 is described above as being a part of an axle housing assembly for a rear axle assembly for a rear-wheel-drive vehicle, it will be appreciated that the principles of the present disclosure are applicable to housings and covers of other drivetrain components. For example, the cover 60 could be configured for use in a front axle assembly, a transfer case assembly, a transmission housing or any other power transfer unit in rear-wheel-drive, front-wheel-drive, four-wheel-drive or all-wheel-drive vehicles.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A drivetrain component comprising:
   a housing defining an internal cavity and a pair of bearing bulkheads;
   a component received in the internal cavity;
   a cover coupled to the housing and closing a side of the internal cavity, the cover including a pair of bearing caps, each of the bearing caps being mounted to a corresponding one of the bearing bulkheads; and a pair of bearings received on the component, each bearing being engaged to an associated one of the bearing bulkheads and an associated one of the bearing caps, wherein the cover comprises a shell portion and a bridge portion that are formed of different materials.

2. The drivetrain component of claim 1, wherein the bearing caps are integrally formed with the bridge portion.

3. The drivetrain component of claim 1, wherein the shell portion is formed of plastic and wherein the bridge portion is formed of metal.

4. The drivetrain component of claim 1, wherein the shell portion is cohesively bonded to the bridge portion.

5. The drivetrain component of claim 1, wherein the bridge portion is at least partly encased in the shell portion.

6. The drivetrain component of claim 1, wherein the component is a differential case.

7. The drivetrain component of claim 6, wherein a differential gearset is received in the differential case and wherein a pair of shafts are coupled to output members of the differential gearset for rotation therewith.

8. The drivetrain component of claim 1, wherein a shoulder is formed into each pair of the bearing bulkheads and the bearing caps, and wherein a gasket is received against each shoulder.

9. The drivetrain component of claim 1, wherein the cover includes a mount that is adapted to mount the drivetrain component to a frame.

10. The drivetrain component of claim 9, wherein the mount comprises at least one boss that is configured to receive a fastener.

11. The drivetrain component of claim 10, wherein the mount comprises two bosses, each boss being fixedly coupled to a corresponding one of the bearing caps.

12. A drivetrain component comprising:

a carrier housing having a pair of bearing bulkheads and a pair of mounting flanges, the bearing bulkheads defining a rotational axis, the mounting flanges being disposed on opposite sides of the rotational axis such that a first one of the mounting flanges spans the bearing bulkheads on a first side of the rotational axis and a second one of the mounting flanges spans the bearing bulkheads on a second side of the rotational axis;

a differential assembly mounted to the bearing bulkheads, the differential assembly comprising a differential case and a pair of differential bearings mounted to the differential case, the differential bearings being received on the bearing bulkheads; and a cover having a shell portion and a bridge portion, the shell portion being mounted to the mounting flanges, the bridge portion being coupled to the bearing bulkheads and securing the differential bearings to the carrier housing.

13. The drivetrain component of claim 12, wherein the bridge portion is a discrete component that is coupled to the shell portion.

14. The drivetrain component of claim 13, wherein the shell portion is over-molded onto the shell portion such that at least a portion of the bridge portion is encased in the shell portion.

15. The drivetrain component of claim 13, wherein the shell portion is cohesively bonded to the bridge portion.

16. The drivetrain component of claim 13, wherein the shell portion is formed of a first material and the bridge portion is formed of a second, different material.

17. The drivetrain component of claim 16, wherein the first material comprises plastic.

18. The drivetrain component of claim 16, wherein the second material comprises metal.

19. The drivetrain component of claim 12, wherein the bridge portion comprises a mount having a pair of bosses, each of the bosses being adapted to receive a fastener therein to mount the cover to a vehicle sub-frame.

20. A drivetrain component comprising:

a carrier housing having a pair of bearing bulkheads and a pair of mounting flanges, the bearing bulkheads defining a rotational axis, the mounting flanges being disposed on opposite sides of the rotational axis such that a first one of the mounting flanges spans the bearing bulkheads on a first side of the rotational axis and a second one of the mounting flanges spans the bearing bulkheads on a second side of the rotational axis;

a differential assembly mounted to the bearing bulkheads, the differential assembly comprising a differential case and a pair of differential bearings mounted to the differential case, the differential bearings being received on the bearing bulkheads; and a cover having a shell portion and a bridge portion, the shell portion being formed of a first material comprising plastic that is over-molded onto the bridge portion such that at least a portion of the bridge portion is encased in and cohesively bonded to the shell portion, the shell portion being mounted to the mounting flanges, the bridge portion being formed of a second material comprising metal, the bridge portion being coupled to the bearing bulkheads and securing the differential bearings to the carrier housing, the bridge portion having a mount that comprises a pair of bosses, each of the bosses being adapted to receive a fastener therein to mount the cover to a vehicle sub-frame.

* * * * *

UNITED STATES PATENT AND TRADEMARK OFFICE
CERTIFICATE OF CORRECTION

| | | |
|---|---|---|
| PATENT NO. | : 8,657,716 B1 | Page 1 of 1 |
| APPLICATION NO. | : 13/613435 | |
| DATED | : February 25, 2014 | |
| INVENTOR(S) | : Neil John Whyte et al. | |

It is certified that error appears in the above-identified patent and that said Letters Patent is hereby corrected as shown below:

In the Specification:

Column 3, Line 60, After "pinion", insert --assembly--

Column 3, Line 63, After "pinion", insert --assembly--

Signed and Sealed this
Twentieth Day of May, 2014

Michelle K. Lee
*Deputy Director of the United States Patent and Trademark Office*